Dec. 27, 1966     A. FRIEDMAN     3,295,141
APPARATUS FOR RECORDING BY ELECTROSTATICALLY
RUPTURING MICROCAPSULES
Original Filed Dec. 20, 1963
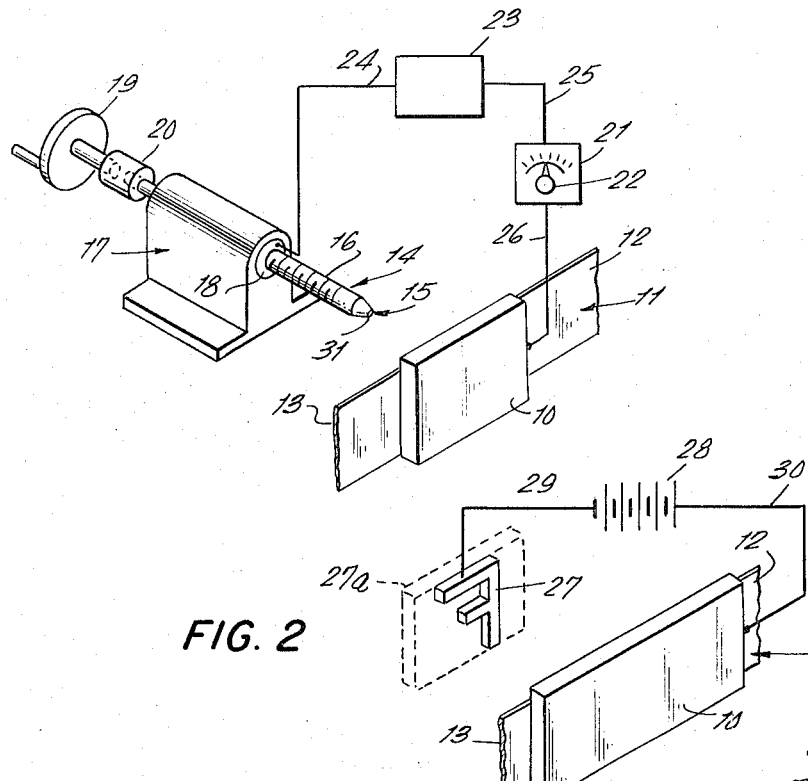
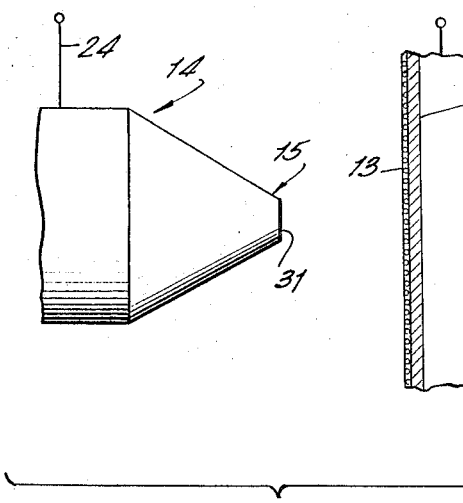
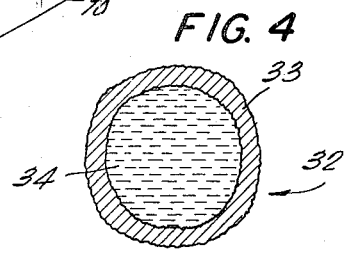
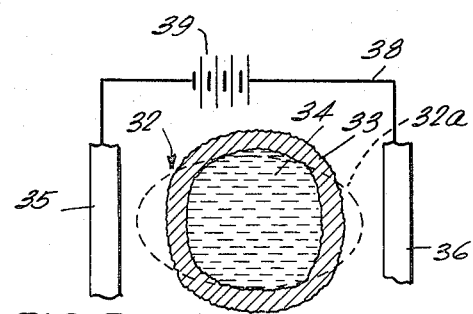
INVENTOR.
ABRAHAM FRIEDMAN
BY
Friedman & Goodman
ATTORNEYS United States Patent Office 3,295,141
Patented Dec. 27, 1966

3,295,141
APPARATUS FOR RECORDING BY ELECTROSTATICALLY RUPTURING MICROCAPSULES
Abraham Friedman, 288 Bay 38th St.,
Brooklyn, N.Y. 11214
Original application Dec. 20, 1963, Ser. No. 332,117, now Patent No. 3,206,755, dated Sept. 14, 1965. Divided and this application July 22, 1965, Ser. No. 493,947
3 Claims. (Cl. 346—74)

This application is a division of S.N. 332,117, filed December 20, 1963, now U.S. Patent 3,206,755.

This invention relates to a method of exposing the contents of micro-capsular material and, more particularly, to a method of rupturing the mantle of a micro-capsule by the application of an electrostatic field in order to produce indicia or for other purposes.

The term "micro-capsule" as herein employed is intended to designate a minute or microscropic capsule wherein a nucleous or microscropic drop of liquid material is surrounded by a mantle of relatively impervious material. The mantle is relatively thin and pressure rupturable. Micro-capsules of the type to which reference is here made have formed by coacervation as well as by methods involving interfacial polycondensation. Reference in this connection is made to the following United States Letters Patent.

| | |
|---|---|
| Re. 24,899 | November 29, 1960, B. K. Green |
| 2,299,693 | October 20, 1942, B. K. Green |
| 2,374,862 | May 1, 1945, B. K. Green |
| 2,730,456 | January 10, 1956, B. K. Green et al. |
| 2,730,457 | January 10, 1956, B. K. Green et al. |
| 2,800,457 | July 23, 1957, B. K. Green et al. |
| 2,800,458 | July 23, 1957, B. K. Green |
| 2,953,470 | September 20, 1960, B. K. Green et al. |
| 2,971,916 | February 14, 1961, L. Schleicher et al. |
| 2,988,461 | June 13, 1961, H. J. Eichel |
| 3,016,308 | January 9, 1962, N. Macaulay |
| 3,069,370 | December 18, 1962, E. H. Jensen et al. |

A description of the interfacil polycondensation method is found in abandoned United States patent application Serial No. 813,425 and in SPE Transactions of January of 1963, at page 71.

The profusion of pressure rupturable liquid containing capsules formed by means of the foregoing methods, has a wide variety of applications. A principal application has been as a coating upon a substratum to produce pressure responsive record or transfer materials. In such cases the coating of micro-capsular material is subjected to mechanical impact or pressure, whereby the capsule mantle or wall is broken or ruptured. The capsule contents are thus exposed and released. In some cases the exposed material is reactive with the atmosphere to produce visible markings or indicia while in other applications the exposed or released material is brought into contact with additional reactive substances for similar purposes. Exposure or release of the encapsulated material may be desired for transfer contact as well as a variety of other uses. The requirement of the application of mechanical impact or pressure in order to rupture the capsule wall has constituted a limitation upon the utilization of this material.

It is an object of this invention to provide a method for exposing or releasing the contents of micro-capsular material by means of the application of an electrostatic field in the region of said capsule of sufficient intensity to cause the capsule wall to be ruptured.

Other and further objects and benefits of this invention will appear from specifications, claims, and the accompanying drawings, wherein:

FIGURE 1 is a diagrammatic view of one form of apparatus for carrying out the method of the present invention;

FIGURE 2 is a diagrammatic view of another form of apparatus therefor;

FIGURE 3 is a fragmentary view of the apparatus shown in FIGURE 1, partly in section and on an enlarged scale;

FIGURE 4 is a diagrammatic view of a cross-section of an individual capsule; and FIGURE 5 is a diagrammatic view indicating a capsule in the process of being subjected to an electrostatic field.

In FIGURES 1, 2 and 3 there is shown a form of apparatus whereby the instant invention may be practiced. In its principal features, the apparatus comprises a base electrode designated by the numeral 10 against which a record sheet designated generally by the numeral 11 is disposed. The record sheet may if desired be advantageously mounted for transport across the face of electrode 10 by conventional means, not shown. The sheet of record material 11 is provided with a layer of liquid containing micro-capsular material as described in the aforementioned patents, the contents of which it is desired to expose or release. The capsular material may be disposed upon a surface of the base sheet 12 in the form of a coating 13, the base sheet, such as paper, comprising a supporting body therefor. The capsular material may be incorporated in a support material or matrix.

A complementary electrode 14 which is advantageously provided with a conical head 15 and a screw-threaded body 16 is disposed in juxtaposition with the sheet of record material 11. The electrodes are formed of an electro-conductive material. Electrode 14 is carried by a suitable support comprising a housing 17 of an insulating material. The housing 17 is provided with a bore within which a sleeve 18 of conductive material is disposed. Sleeve 18 is provided with an internally threaded bore within the threaded electrode 14 is received. The distal end of electrode 14 carries a crankwheel 19 which is interconnected therewith by means of insulating sleeve 20. It will be apparent that the arrangement electrically isolates the electrode while permitting the adjustment of its position with respect to the recording medium 11 by means of the operation of the handcrank.

A unidirectional high voltage electrostatic field is established between the electrodes 10 and 14, and the intervening micro-capsules by means of a source designated by the numeral 21 which is provided with means 22 for adjusting the field intensity. There may also be provided a control means 23 for controlling or interrupting the field as and when desired. Conductors 24, 25 and 26 interconnect the associated power and control means.

The spacing between the electrodes is adjusted so that at the applied voltage the maximum potential gradient established in the dielectric represented by the surrounding atmosphere is below the point at which electrical breakdown will occur. The voltage or potential difference employed is not critical and will vary depending upon the size, wall thickness and chemical composition of the mantle and its contents. Potential differences of 800 to 125 kv. are considered to be applicable with suitable adjustment of electrode spacing to avoid dielectric breakdown in the space between the electrodes. It may be considered that air has a dielectric constant of 1.00054 and a dielectric strength of 0.8 kv./mm. in order to arrive at an approximate initial spacing for the value of the voltage employed. The spacing may be then further adjusted or initially determined empirically, determined by the adjustment of the spacing so that at the applied voltage lysis or rupture of the capsular material occurs, but below the point at which electrical breakdown will occur in the intervening air space. In this connection the polar nature of the capsule contents will permit effective operation of the system at lower potential gradients. Polar compounds may therefore be advantageously employed as a capsule nucleous. The degree of polarity of the core material and the physical characteristics of the mantle material results in substantial variation in the electrode spacing and consequent voltage gradient requisite for capsule rupture.

The mechanism by which the micro-capsule ruptures is not completely understood. One may assume a microcapsule to be generally spherical having the cross-section illustrated on an enlarged scale in FIGURE 4. The capsule designated generally by the numeral 32 comprises a polar liquid core 34 enclosed by a mantle 33. When a capsule of this type is disposed in the electrostatic field established between electrodes 35 and 36 connected to a source 39 through conductors 37 and 38 respectively it would appear that the capsule is subjected to aberration. The field may thus tend to elongate the capsule in a direction parallel to the lines of force to what may be a generally ovate form shown by the broken line 32a. The tendency to change the geometry of the capsule and the volume enclosed thereby would appear to place the bounding surface or mantle under sufficient strain to result in the lysis or rupture thereof thus exposing the capsule contents.

Whereas the arrangement of FIGURE 1 illustrates the manner in which dots or lines may be produced upon the record sheet, the arrangement of FIGURE 2 illustrates the manner in which a complete symbol such as a letter or numeral may be formed. In this case an electrode 27 in the shape of the desired symbol is suitably supported as indicated at 27a and connected to a suitable potential source indicated by the numeral 28 through conductor 29. Conductor 30 leads to the base electrode 10 which carries record sheet 11. Application of the voltage source establishes the desired potential gradient to cause rupture of the coating 13 of the capsular material carried by the base sheet 12 in conformity with the symbol configuration.

While I have illustrated and described the presently preferred embodiment of the invention, it will be apparent that various changes and modifications may be made therein without however departing from the basic inventive concept thereof as set forth in the appended claims.

I claim:

1. Apparatus for exposing or releasing the contents of a capsule wherein a nucleous of liquid material is enclosed in a mantle of pressure rupturable material, comprising a pair of spaced electrodes, a capsular material disposed between said electrodes and a source of high voltage connected to said electrodes for rupturing said capsule and releasing or exposing its contents.

2. Apparatus for exposing or releasing the contents of capsular material wherein a nucleous of liquid material is surrounded by a mantle of relatively impervious material, a support for the capsular material, spaced electrode means between which said capsule bearing suport is disposed, a source of high potential connected across said electrode means whereby an electrostatic field established between the electrodes causes the capsules to be ruptured and to release their contents.

3. Apparatus for exposing or releasing the contents of micro-capsular material wherein a liquid substance is enclosed in a mantle of relatively impervious pressure rupturable material comprising a support having a coating of capsular material on a surface thereof, a pair of spaced electrodes between which said support is disposed, a source of high voltage connected to said electrodes whereby the application of voltage to said electrodes causes the rupture of the capsular material and exposes or releases the contents thereof to form an indication upon said support.

No references cited.

BERNARD KONICK, *Primary Examiner.*

A. I. NEUSTADT, *Assistant Examiner.*